(12) United States Patent
Osterberg

(10) Patent No.: US 6,371,412 B1
(45) Date of Patent: Apr. 16, 2002

(54) METHOD AND APPARATUS FOR REDUCING ACOUSTIC COUPLING

(75) Inventor: David A. Osterberg, Maricopa, AZ (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 09/438,713

(22) Filed: Nov. 11, 1999

(51) Int. Cl.⁷ .................................................. B64G 1/10
(52) U.S. Cl. ..................... 244/158 R; 244/172; 244/1 N
(58) Field of Search .............................. 244/1 N, 158 R, 244/172, 121, 1 K; 210/144; 367/1

(56) References Cited

U.S. PATENT DOCUMENTS

| | | | |
|---|---|---|---|
| 2,387,708 A | * 10/1945 | Arnhym | 454/116 |
| 4,436,036 A | * 3/1984 | Bell | 102/367 |
| 4,817,889 A | * 4/1989 | Henry | 244/1 R |
| 5,526,692 A | * 6/1996 | Keiser | 73/715 |
| 5,743,492 A | * 4/1998 | Chan | 244/118.2 |
| 5,844,815 A | * 12/1998 | Edberg et al. | 364/559 |
| 5,947,240 A | 9/1999 | Davis et al. | 188/378 |
| 6,042,057 A | * 3/2000 | Rice | 244/158 R |

OTHER PUBLICATIONS

The Vibroacoustics Analysis Package; Peter Messore and Frank On; AIAA 38th Structural Dynamics, and Materials Conference and Exhibit Adaptive Structures Forum; pp 4–5.*

* cited by examiner

Primary Examiner—Peter M. Poon
Assistant Examiner—George L. Steele
(74) Attorney, Agent, or Firm—Charles J. Ungemach; Robert E. Greenstien

(57) ABSTRACT

An acoustic vibration isolator for use in preventing damage to a payload connected to a launch vehicle by removing the air around the payload so that acoustic vibrations do not have a medium to travel through to reach the payload.

20 Claims, 2 Drawing Sheets

FIG. 1
FIG. 2
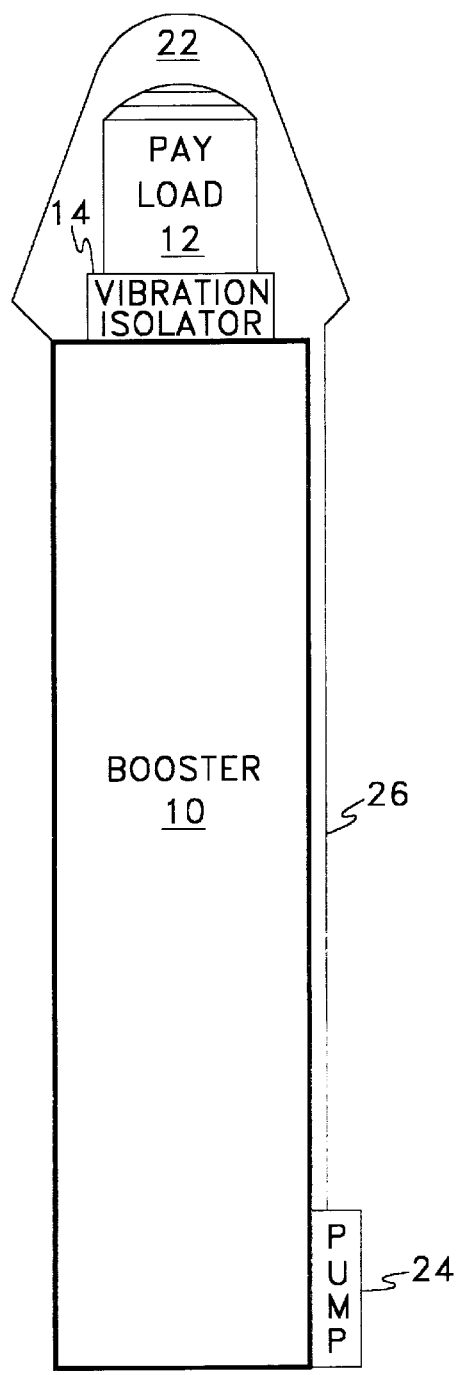
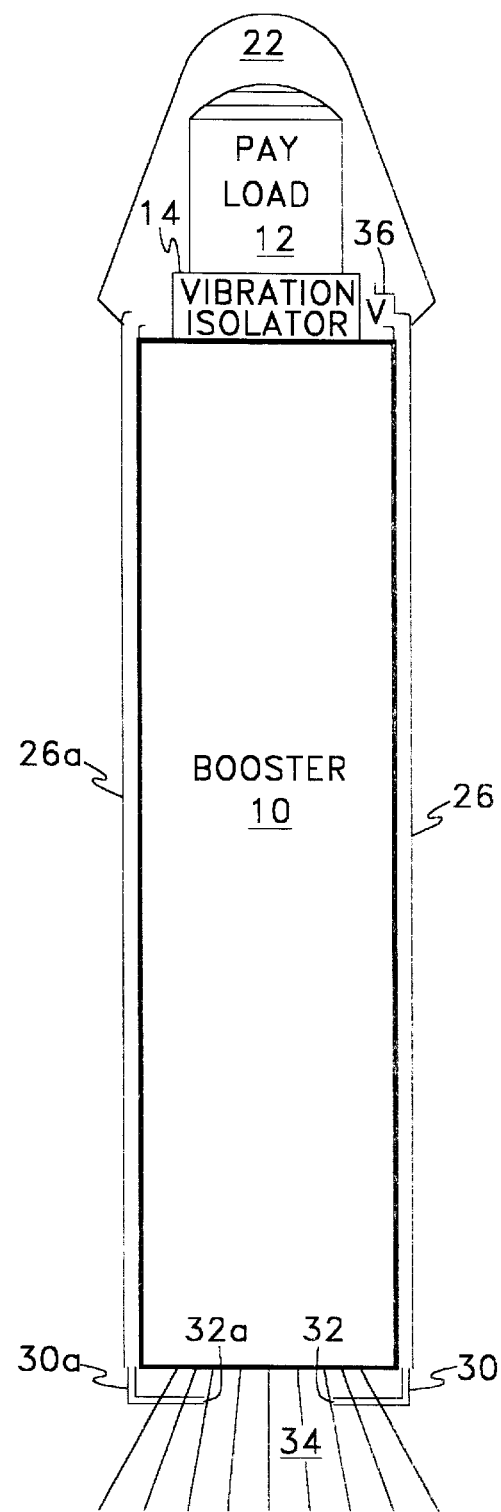

METHOD AND APPARATUS FOR REDUCING ACOUSTIC COUPLING

BACKGROUND OF THE INVENTION

1. Field of the Invention

The present invention relates to the field of vibration isolation and more particularly to vibration isolation of a payload of a missile during launch. Yet more particularly, the present invention relates to the reduction of vibrations caused by acoustic waves transmitted to a payload during passage through earth atmosphere and particularly passing through the sound barrier, or those reflected back from the initial ignition of the rocket engines on the ground

2. Description of the Prior Art

A number of vibration isolation devices have been proposed for use in reducing vibration transmitted from a launch vehicle to the payload during launch. One very successful device of this type may be found in a U.S. Pat. No. 5,947,240 assigned to the assignee of the present invention.

Such devices have concentrated on the reduction of mechanical vibration which is transmitted from the launch vehicle being propelled through the atmosphere by the rocket engines. Little or no effort has been exerted to reduce the vibration which occurs due the speed of the vehicle through the atmosphere particularly around the speed of sound where very large shock waves are produced. These shock waves cause the shroud around the payload to vibrate with considerable force and these vibrations are transmitted through the air in the shroud to the payload. It has been estimated that at the peak, the acoustic vibration produces about one half of the total vibration applied to the payload and accordingly, a need has arisen for acoustic vibration isolators.

BRIEF DESCRIPTION OF THE INVENTION

The present invention overcomes the problem of acoustic vibration by causing an evacuation of the air surrounding the payload before or during launch so that when the vibrations from travelling through the atmosphere and the shock waves produced by the sound barrier occur, the medium for transmitting them to the payload is gone or reduced and the payload does not receive them.

BRIEF DESCRIPTION OF THE DRAWINGS

FIG. 1 is a schematic representation of one embodiment of the present invention;

FIG. 2 is a schematic representation of a second embodiment of the present invention; and, FIG. 3 is a schematic representation of a third embodiment of the present invention.

DETAILED DESCRIPTION OF THE PREFERRED EMBODIMENTS

Figure 3:
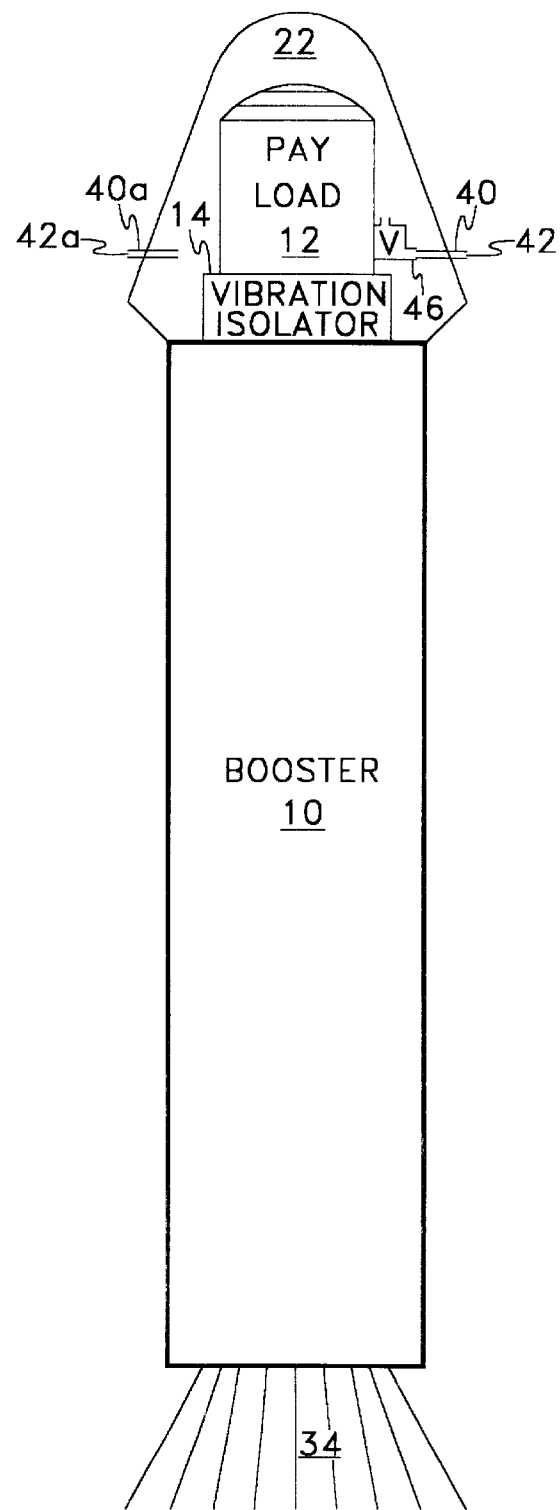

A rocket carrying a payload such as a satellite is usually constructed with a vibration isolator mounted between the rocket booster or launch vehicle and the payload to isolate and minimize any vibration which may be transmitted between the booster and the payload. Isolators such as that shown by the above mentioned U.S. Pat. No. 5,947,240 have proven very successful in accomplishing this task. The vibration isolator has little effect, however, on vibration which is transmitted by virtue of acoustic coupling between the rocket housing and payload due to the rapid speed of transit of the booster and payload through the atmosphere or those reflected back from the initial ignition of the rocket engines on the ground To protect the payload during launch, an outer casing or shroud is usually placed about the payload so that it will not be exposed to the rush of air occurring as the booster travels through the atmosphere. While the shroud is usually sealed to the booster, it will normally have a plurality of holes so that as the atmosphere becomes more and more rarefied, the internal pressure in the shroud will not build up to an explosive force.

As the booster and payload continue to accelerate and rise, the buffeting due to the rapid passage makes the shroud vibrate and this vibration is transferred to the payload through the air in the shroud. The buffeting reaches a peak at or near the speed of sound where sizable shock wave occur that could severely damage the payload. To reduce the risk, the shroud is usually constructed of a heavy material that will resist bending and flexing from the buffeting and shock wave. This is, of course, undesirable since the weight of the shroud also increases with the strength of the material thus causing the rocket to have to lift greater weight in order to leave the atmosphere.

Once the booster and payload have passed through the sound barrier and have substantially left the atmosphere, the need for the shroud disappears and it is usually discarded at this time. The explosive force used to separate the parts of the shroud to discard them can also provide a shock to the payload if there is air present. After this, little or no acoustic buffeting occurs because there is little atmosphere around the payload.

The present invention removes the acoustic vibration by removing the air in the shroud so that it cannot transmit the vibrations. This may be done on the ground before the rocket leaves the launch pad or may be done on the way up. There are advantages and disadvantages to both ways. When the shroud is evacuated before leaving the launch pad, the pump and the piping may be left behind which reduces the weight but the material of the shroud must be strong enough to resist the atmospheric pressure acting on the outside of the shroud. If the shroud is evacuated on the way up, the pressure can be reduced gradually so buffeting on the way up is reduced and the atmospheric pressure from the outside is minimized. When the booster reaches the velocity of sound, the pressure on the inside of the shroud will be quite small thus minimizing the shock, but either the weight of the evacuating mechanism must be carried along or some other way of evacuating the shroud must be used.

The present invention also proposes an alternate way of evacuating the shroud gradually on the way up without carrying a pump. More particularly, using the venturi tube principle, the shroud may be evacuated by passing exhaust gas or air across the open end of the venturi tube, either by placing it in the path of the atmospheric air passing by the booster, or by exposing the open end of the venturi tube to the rush of air out of the rocket exhaust. In either event, the reduction of pressure at the other end of the venturi tube causes the inside the shroud to be more and more evacuated as the rocket rises.

In order to prevent the pressure inside of the shroud from becoming too small during the booster rise, a small pressure differential valve, or burp valve, may be placed in the venturi tube to keep the pressure in the shroud a certain predetermined value less than the atmospheric pressure.

Some of the various embodiments of the present invention are described in connection with the Figures in which FIG.

1 shows a rocket launch vehicle or booster 10, as it might appear prior to actual launch. A payload 12, which may be a satellite, is shown mounted on the booster 10 by a vibration isolator 13 which may be like the isolator described in the above mentioned U.S. Pat. No. 5, 947,240. In the Figures, an outer casing or shroud 20 is shown mounted to the top of booster 10 in a sealed fashion so as to encapsulate and seal the payload 12 in the space 22 formed by the shroud 12. Shroud 20 is normally made in two or three clamshell like parts to facilitate removal from the booster 10 after the booster and payload are in space.

In FIG. 1, a pump 24 is shown connected to a pipe 26 which leads to the inside of the shroud 20. When activated, pump 24 evacuates the space inside shroud 20. When evacuation is performed prior to launch, the pipe 26 may then be sealed and the pump 24 discarded. If it is desired to evacuate space 22 slowly during launch, pump 24 may remain attached to the booster 20 and move with it upwardly through the atmosphere. As the booster 10 and payload 12 rise, pump 24 would then keep reducing the pressure inside the shroud 20, little by little, so as to keep the space 22 at a predetermined value with respect to the atmospheric pressure outside the shroud 20. This allows the material of the shroud to be lighter than it would otherwise have to be. Air would be continually removed so that space 22 would become a vacuum just before the speed of the booster 10 reached the sound barrier thus preventing the shock waves from affecting the payload 12.

FIG. 2 shows an alternate embodiment wherein the elements common to FIG. 1 continue to have the same reference numerals. In FIG. 2, the evacuation of the space 22 in shroud 20 is caused while the booster and payload are rising through the atmosphere after launch and without pump 24. Instead of using a pump, a venturi tube 30 is shown having an open end 32 exposed to the exhaust 34 and the other end of the venturi tube is attached to pipe 26. As the rocket rises, the rush of exhaust gases past the open end 32 of venturi tube 30 causes the pipe 26 to remove air from the space 22 and provide a complete vacuum at about a time just before the booster 10 and payload 12 reach the sound barrier. To better control the rate of evacuation, more than one venturi tube may be used. For example, venturi tube 30a with open end 32a exposed to the exhaust gases 34 may be connected through a pipe 26a to the space 22 inside of shroud 20 thus increasing the rate of evacuation. Other venturi tubes (not shown) may be used, if needed.

To control the vacuum in space 22 with respect to the outside atmosphere a differential valve, or burp valve 36, may be connected between one of the pipes 26 and 26a and the inside of shroud 20 so that whenever the differential pressure between space 22 and the outside atmosphere exceeds a predetermined value, valve 36 will operate to adjust the differential pressure to the desired value.

FIG. 3 shows yet a further embodiment of the present invention where the pipes 26 and 26a of FIG. 2 have been removed and the shroud is built to contain one or more venturi tubes 40 and 40a having open ends 42 and 42a, for example, extending to the outside atmosphere to be exposed to the air rushing by as the launch vehicle or booster 20 passes through the air. Again, the venturi tubes 40 and 40a withdraw air from space 22 gradually as the rocket rises faster and faster through the atmosphere so that the inside of shroud 20 becomes evacuated before the rocket reaches the speed of sound. Again, if desired, a differential valve 46 may be used to assure that the differential pressure between space 22 and the outside atmosphere does not exceed a predetermined value.

It is thus seen that I have provided a new and unique way of protecting the payload of a rocket from acoustic vibrations occurring during launch. Many changes and substitutions will occur to those having ordinary skill in the art and I do not wish to be restricted to the specific disclosures used in connection with the description of the preferred embodiments. For example, while a single stage has been used for purposes of the present invention, it is realized that many rockets utilize multiple states. The arrangement of the components of the present invention and their attachment to the rocket may need to be modified for use with multiple stages.

What is claimed is:

1. Acoustic vibration isolation apparatus for minimizing the transmission of acoustic vibrations to a payload comprising:

a shroud surrounding the payload; and evacuation apparatus connected to the shroud to evacuate substantially all the air from the shroud such that acoustic waves are not transmitted to the payload.

2. The acoustic vibration isolation apparatus of claim 1 wherein the shroud is a sealed container that is removed when the acoustic vibrations cease.

3. The acoustic vibration isolation apparatus of claim 2, wherein the payload is connected to the vehicle which experiences buffeting for reflected acoustic energy on a launch pad or when moving through the atmosphere.

4. The acoustic vibration isolation apparatus of claim 3 wherein the vehicle is a launch vehicle for delivering the payload to space.

5. The acoustic vibration isolation apparatus of claim 4 wherein the vehicle experiences speeds in excess of the speed of sound and at least part of the acoustic buffeting is due to the shock wave occurring when passing through the sound barrier.

6. The acoustic vibration isolation apparatus of claim 4 wherein the evacuation apparatus comprises a pump which is removed after evacuation of the shroud and before the launch of the launch vehicle.

7. The acoustic vibration isolation apparatus of claim 4 wherein the evacuation apparatus comprises a pump which evacuates the shroud after launch while the launch vehicle delivers the payload to outer space.

8. The acoustic vibration isolation apparatus of claim 4 wherein the launch vehicle includes thrusters producing moving gases and the evacuation apparatus comprises a venturi tube having an end exposed to the moving gases.

9. The acoustic vibration isolation apparatus of claim 4 wherein the evacuation apparatus comprises a venturi tube extending through the shroud into the atmosphere around the shroud as it rises during launch.

10. The acoustic vibration isolation apparatus of claim 4 further including a differential pressure valve connected to the evacuation apparatus and the interior of the shroud to assure that the pressure in the shroud does not vary more than a predetermined amount with respect to the atmosphere surrounding the shroud.

11. The method of preventing acoustic vibrations from damaging a payload comprising the steps of:

A. connecting a shroud around the payload; and

B. evacuating the interior of the shroud around the payload so that acoustic vibrations are not able to be transmitted to the payload.

12. The method of claim 11 wherein the payload is connected to a launch vehicle for transmission into space beyond earth atmosphere and step B is performed prior to launch and including the step of:

C. discarding the evacuation apparatus prior to launch.

13. The method of claim 11 wherein the payload is connected to a launch vehicle for transmission into space beyond earth atmosphere and step B is performed during launch.

14. The method of claim 11 wherein the payload is connected to a launch vehicle for transmission into space beyond earth atmosphere and step B is performed during launch and before reaching the sound barrier.

15. The method of preventing vibrations from damaging a payload which is connected to a launch vehicle producing an exhaust for transmission through the earth atmosphere at speeds exceeding that which causes shock waves form passing the sound barrier comprising the steps of:
   A. placing a vibration isolator between the payload and the launch vehicle to suppress mechanical vibration transmitted form the launch to the payload;
   B. placing a sealed shroud around the payload, and
   C. removing the gasses in the shroud around the payload to provide a vacuum at least prior to passing the sound barrier to suppress acoustic vibration form buffeting as the launch vehicle passes through earth atmosphere and to suppress the acoustic vibration due the shock wave of passing the the sound barrier.

16. The method of claim 15 wherein step B comprises:
   B1. attaching an evacuating pump to the shroud prior to launch.

17. The method of claim 15 wherein step B comprises:
   B1. attaching an evacuating pump to the shroud to withdraw the gases during launch.

18. The method of claim 15 wherein step B comprises:
   B1. attaching a venturi tube to the launch vehicle through the shroud and into the exhaust of the launch vehicle so that the gasses in the shroud are removed during the launch and prior to passing the sound barrier.

19. The method of claim 15 wherein the step B comprises:
   B1. Attaching a venturi tube into the rush of the atmosphere passing the launch vehicle during launch so that the gasses in the shroud are withdrawn during the passage of the launch vehicle through earth's atmosphere and prior to passing the sound barrier.

20. The method of claim 15 further including the step of connecting a differential pressure valve between the interior of the shroud and the atmosphere around the shroud to keep the differential therebetween from exceeding a predetermined value.

* * * * *